United States Patent
Li et al.

(10) Patent No.: US 12,008,239 B1
(45) Date of Patent: Jun. 11, 2024

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Wei-Cheng Li, Miaoli County (TW); Ping-Cheng Chen, Taoyuan (TW); Yu-Chung Shen, Miaoli County (TW); Jia-Li Xu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 33 days.

(21) Appl. No.: 18/151,470

(22) Filed: Jan. 9, 2023

(30) Foreign Application Priority Data

Dec. 2, 2022 (TW) .................................. 111146384

(51) Int. Cl.
*G06F 3/06* (2006.01)
(52) U.S. Cl.
CPC ............ *G06F 3/061* (2013.01); *G06F 3/0659* (2013.01); *G06F 3/0679* (2013.01)
(58) Field of Classification Search
CPC ....... G06F 3/061; G06F 3/0659; G06F 3/0679
See application file for complete search history.

(56) References Cited

U.S. PATENT DOCUMENTS

| | | | | |
|---|---|---|---|---|
| 10,346,068 | B2* | 7/2019 | Ishii | G11C 11/5642 |
| 2014/0068383 | A1* | 3/2014 | Cheng | G06F 12/00 |
| | | | | 711/E12.008 |
| 2014/0321202 | A1* | 10/2014 | Yang | G11C 29/804 |
| | | | | 365/185.09 |
| 2015/0046772 | A1* | 2/2015 | Bennett | G06F 11/1016 |
| | | | | 714/768 |
| 2017/0249995 | A1* | 8/2017 | Park | G11C 16/3427 |
| 2019/0034290 | A1* | 1/2019 | Guo | G06F 11/1072 |
| 2019/0244673 | A1* | 8/2019 | Yang | G11C 16/14 |
| 2020/0335169 | A1* | 10/2020 | Yu | G11C 16/3436 |
| 2022/0066651 | A1* | 3/2022 | Miller | G11C 16/105 |
| 2023/0146041 | A1* | 5/2023 | Lee | G06F 3/0652 |
| | | | | 711/103 |

FOREIGN PATENT DOCUMENTS

CN 112230849 1/2021

OTHER PUBLICATIONS

"Office Action of Taiwan Counterpart Application", issued on Apr. 11, 2023, p. 1-p. 6.

* cited by examiner

*Primary Examiner* — William E. Baughman
(74) *Attorney, Agent, or Firm* — JCIPRNET

(57) ABSTRACT

A memory management method, a memory storage device, and a memory control circuit unit are disclosed. The method includes: sending an erase command sequence configured to erase a first physical erasing unit in a rewritable non-volatile memory module; and sending a write command sequence configured to perform a dummy write operation on a second physical erasing unit in the rewritable non-volatile memory module with correspondence to the erasing of the first physical erasing unit. The dummy write operation is configured to store dummy data to the second physical erasing unit.

21 Claims, 6 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111146384, filed on Dec. 2, 2022. The entirety of the above-mentioned patent application is hereby incorporated by reference herein and made a part of this specification.

BACKGROUND OF THE INVENTION

Field of the Invention

The invention relates to a memory management technique, and more particularly, to a memory management method, a memory storage device, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable electronic devices provided above.

Generally speaking, each physical erasing unit in the rewritable non-volatile memory module may perform erasing and data writing independently. However, in practice, there may be some correlation between physical erasing units A and B in the same rewritable non-volatile memory module. This correlation causes the write operation to the physical erasing unit B to readily fail after the erasing of the physical erasing unit A is performed. Therefore, it is necessary to propose a corresponding solution to alleviate this issue.

SUMMARY OF THE INVENTION

The invention provides a memory management method, a memory storage device, and a memory control circuit unit that may improve the usage efficiency of the physical erasing unit.

An exemplary embodiment of the invention provides a memory management method configured for a rewritable non-volatile memory module. The rewritable non-volatile memory module includes a plurality of physical erasing units. The memory management method includes: sending an erase command sequence, wherein the erase command sequence is configured to erase a first physical erasing unit in the plurality of physical erasing units; and sending a write command sequence with correspondence to the erasing of the first physical erasing unit, wherein the write command sequence is configured to perform a dummy write operation on a second physical erasing unit in the plurality of physical erasing units. The dummy write operation is configured to store dummy data to the second physical erasing unit.

An exemplary embodiment of the invention further provides a memory storage device including a connection interface unit, a rewritable non-volatile memory module, and a memory control circuit unit. The connection interface unit is configured to be coupled to a host system. The rewritable non-volatile memory module includes a plurality of physical erasing units. The memory control circuit unit is coupled to the connection interface unit and the rewritable non-volatile memory module. The memory control circuit unit is configured to: send an erase command sequence, wherein the erase command sequence is configured to erase a first physical erasing unit in the plurality of physical erasing units; and send a write command sequence with correspondence to the erasing of the first physical erasing unit, wherein the write command sequence is configured to perform a dummy write operation on a second physical erasing unit in the plurality of physical erasing units, and the dummy write operation is configured to store dummy data to the second physical erasing unit.

An exemplary embodiment of the invention further provides a memory control circuit unit configured to control a rewritable non-volatile memory module. The rewritable non-volatile memory module includes a plurality of physical erasing units. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to: send an erase command sequence, wherein the erase command sequence is configured to erase a first physical erasing unit in the plurality of physical erasing units; and send a write command sequence with correspondence to the erasing of the first physical erasing unit, wherein the write command sequence is configured to perform a dummy write operation on a second physical erasing unit in the plurality of physical erasing units, and the dummy write operation is configured to store dummy data to the second physical erasing unit.

Based on the above, after the first physical erasing unit in the rewritable non-volatile memory module is erased, one dummy write operation may be correspondingly performed to store the dummy data to the second physical erasing unit in the rewritable non-volatile memory module. In particular, after the dummy write operation is performed, the second physical erasing unit may be used normally without being affected by the erasing of the first physical erasing unit. In this way, the usage efficiency of the physical erasing unit may be effectively improved.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data to the memory storage device or read data from the memory storage device.

Figure 1:
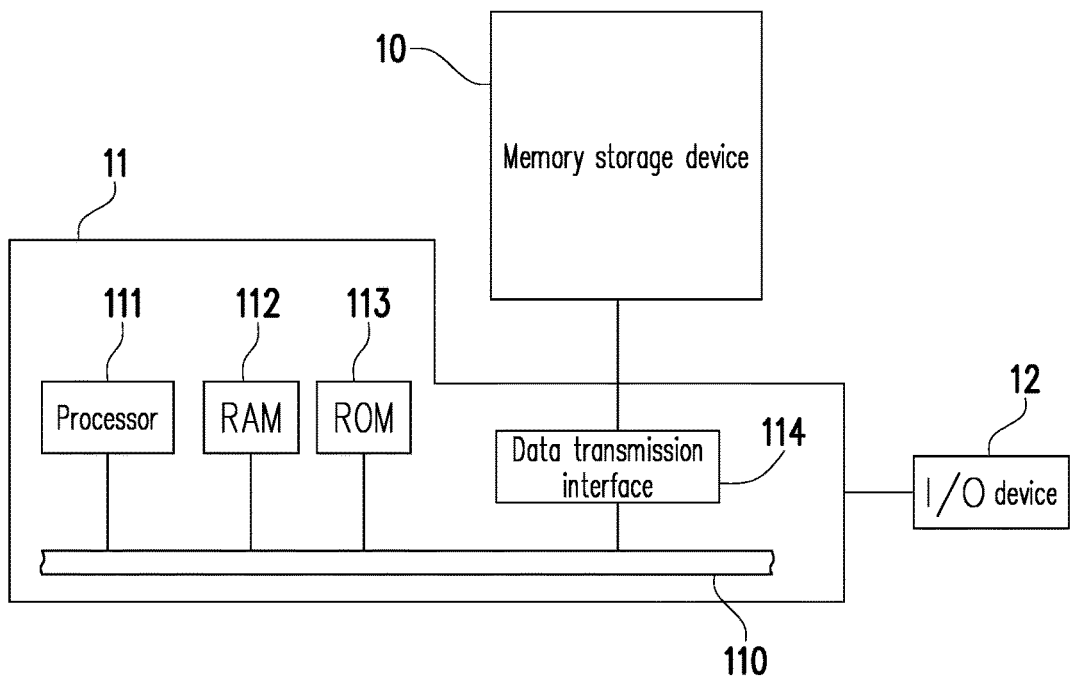
FIG. 1 is a schematic diagram of a host system, a memory storage device, and an input/output (I/O) device shown according to an exemplary embodiment of the invention.
Figure 2:
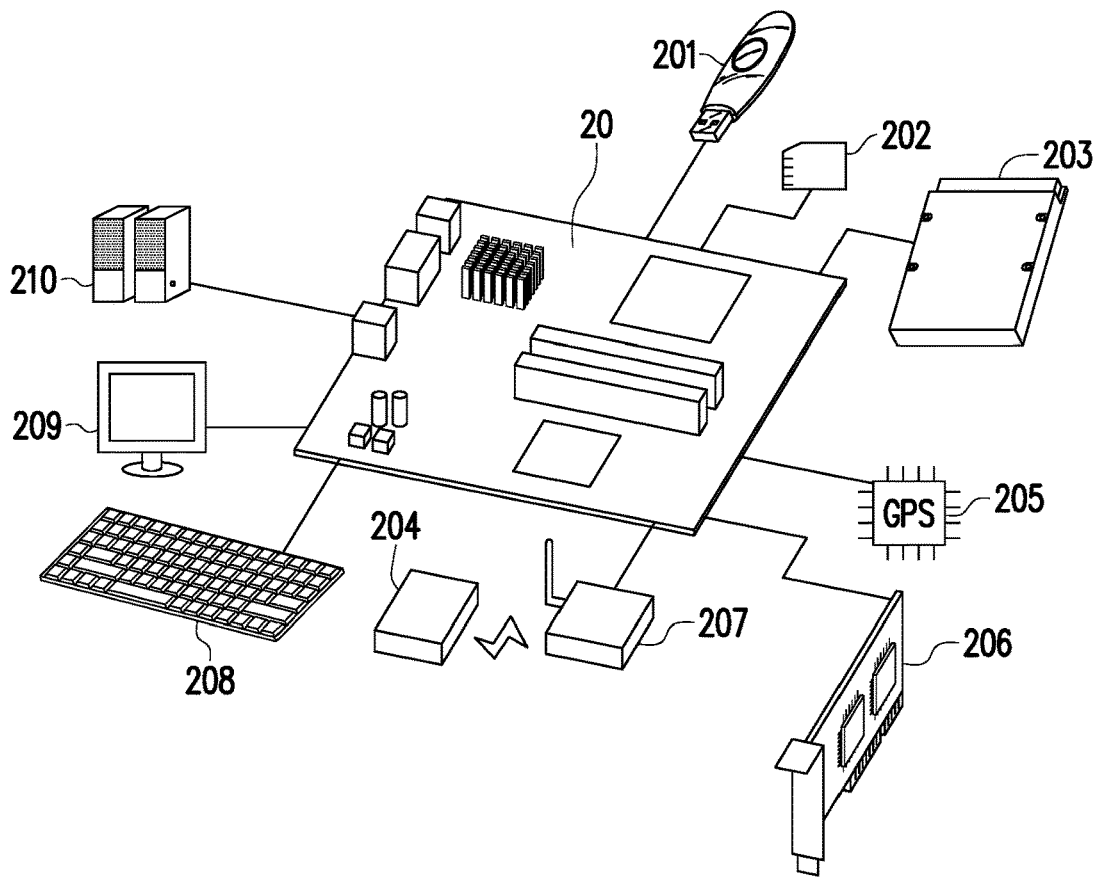
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data to the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
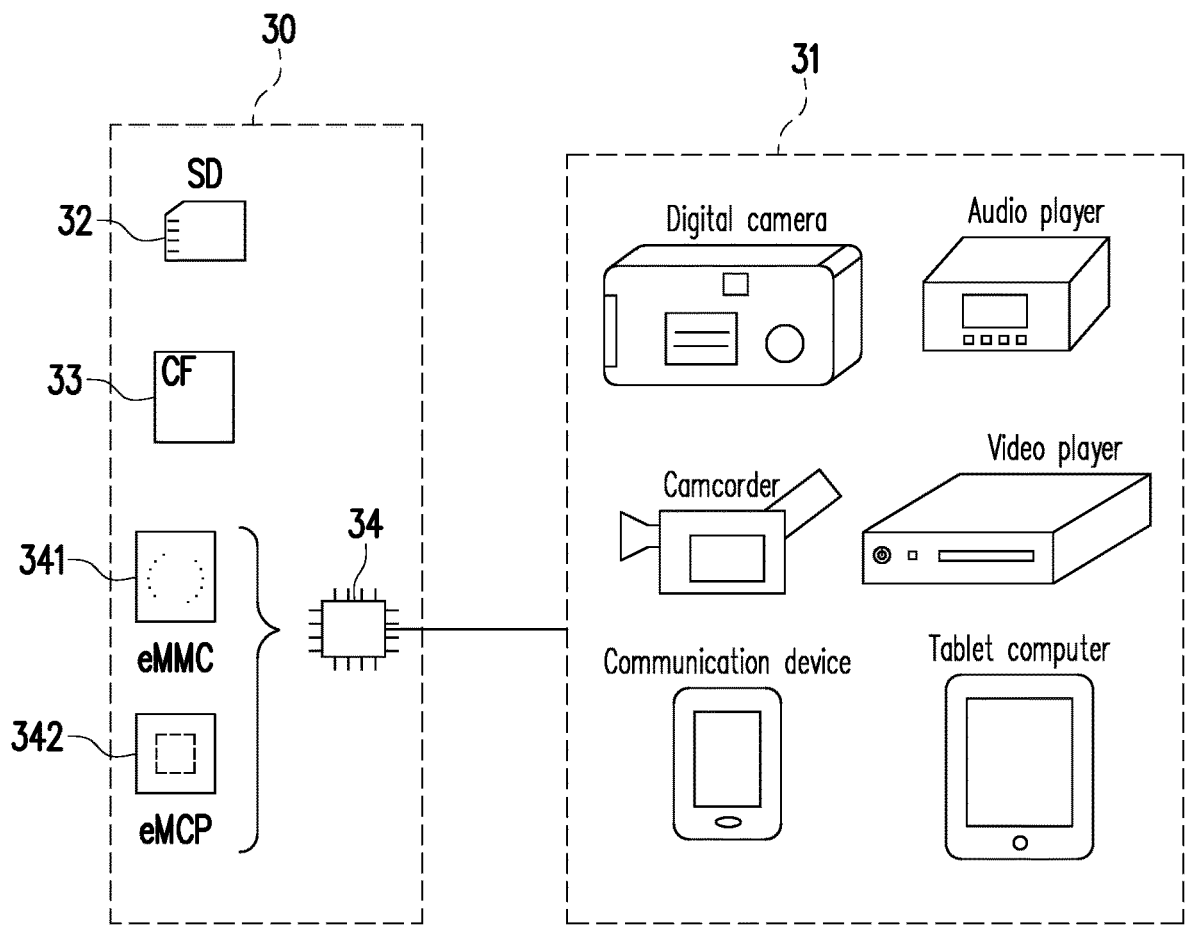
FIG. 3 is a schematic diagram of a host system and a memory storage device shown according to an exemplary embodiment of the invention.

FIG. 3 is a schematic of a host system and a memory storage device shown according to an exemplary embodiment of the invention.

Referring to FIG. 3, the memory storage device 30 may be used in conjunction with the host system 31 to store data. For example, the host system 31 may be a system such as a digital camera, a camcorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
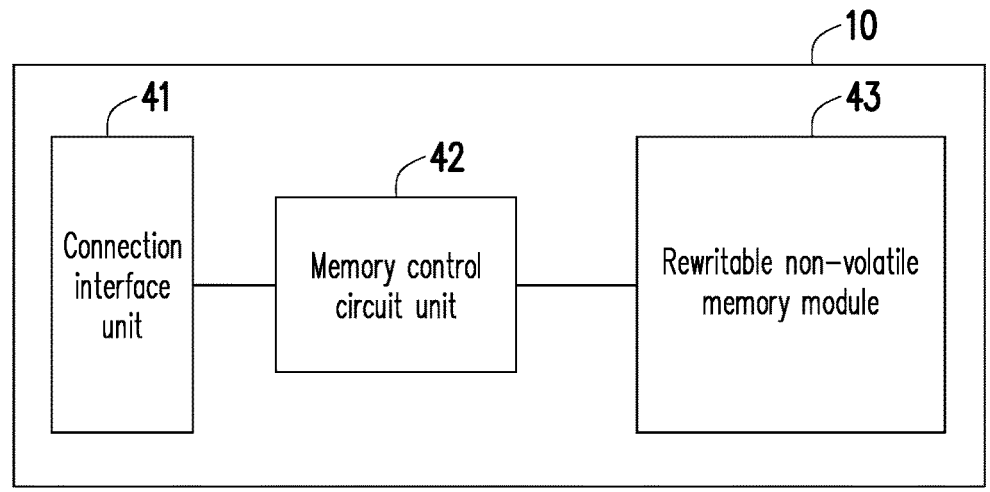
FIG. 4 is a schematic diagram of a memory storage device shown according to an exemplary embodiment of the invention.

FIG. 4 is a schematic diagram of a memory storage device shown according to an exemplary embodiment of the invention.

Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to execute a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical pages configured to store user data, and the redundancy bit area is configured to store system data (for example, management data such as an error correcting code). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
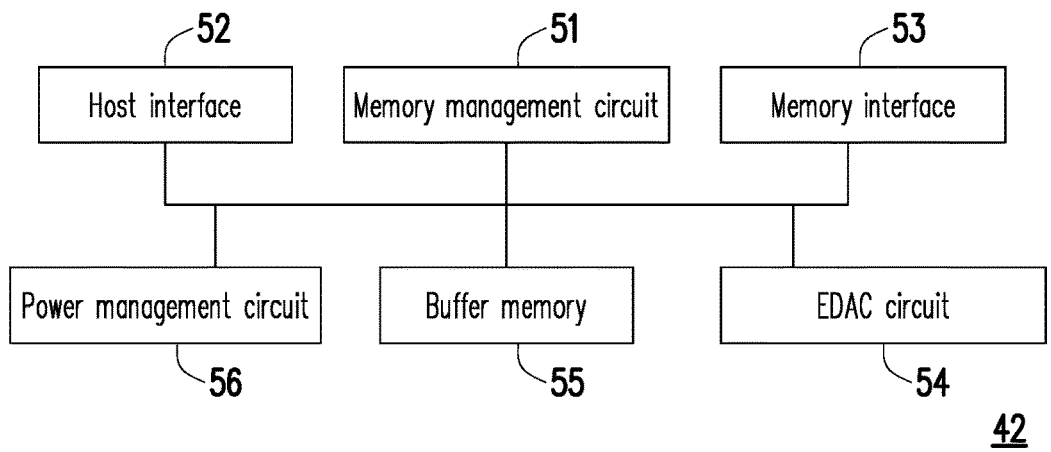
FIG. 5 is a schematic diagram of a memory control circuit unit shown according to an exemplary embodiment of the invention.

FIG. 5 is a schematic diagram of a memory control circuit unit shown according to an exemplary embodiment of the invention.

Referring to FIG. 5, the memory control circuit unit 42 includes a memory management circuit 51, a host interface 52, and a memory interface 53. The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may be communicated with the host system 11 via the host interface 52. The host interface 52 may be used to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends a corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or performing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when reading a command sequence, information such as read identification code or memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 receives a write command from the host system 11, the error detection and correction circuit 54 generates a corresponding error correcting code (ECC) and/or an error detecting code (EDC) for data corresponding to the write command, and the memory management circuit 51 writes the data corresponding to the write command and the corresponding ECC and/or EDC into the rewritable non-volatile memory module 43. Next, when reading data from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
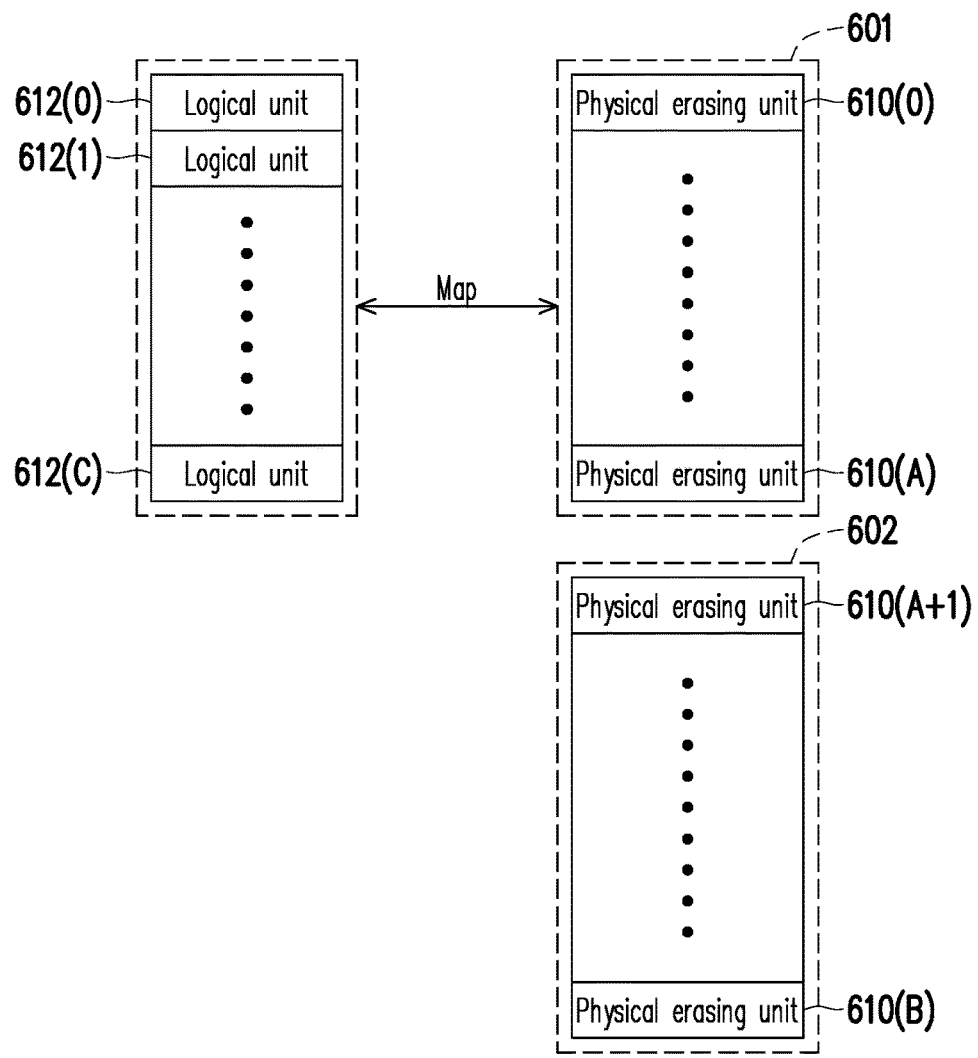
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention.

Referring to FIG. 6, the memory management circuit 51 may logically group physical erasing units 610(0) to 610(B) in the rewritable non-volatile memory module 43 into a storage area 601 and a spare area 602. Each physical erasing unit may include a plurality of physical programming units.

The physical erasing units 610(0) to 610(A) in the storage area 601 are configured to store user data (for example, user data from the host system 11 in FIG. 1). For example, the physical erasing units 610(0) to 610(A) in the storage area 601 may store valid data and/or invalid data. The physical erasing units 610(A+1) to 610(B) in the spare area 602 do not store data (for example, valid data). For example, if a certain physical erasing unit does not store valid data, this physical erasing unit may be associated (or added) to the spare area 602. In addition, the physical erasing units in the spare area 602 (or physical units that do not store valid data) may be erased. When writing new data, one or a plurality of physical erasing units may be extracted from the spare area 602 to store the new data. In an exemplary embodiment, the spare area 602 is also referred to as a free pool.

The memory management circuit 51 may configure logical units 612(0) to 612(C) to map the physical erasing units 610(0) to 610(A) in the storage area 601. In an exemplary embodiment, each of the logical units corresponds to one logical address. For example, one logical address may include one or a plurality of logical block addresses (LBAs) or other logical management units. In an exemplary embodiment, one logical unit may also correspond to one logical programming unit or be formed by a plurality of continuous or discontinuous logical addresses.

It should be mentioned that, one logical unit may be mapped to one or a plurality of physical erasing units. If a certain physical erasing unit is currently mapped by a certain logical unit, the data currently stored in this physical erasing unit includes valid data. On the other hand, if a certain physical erasing unit is not currently mapped by any logical unit, the data currently stored in this physical erasing unit is invalid data.

The memory management circuit 51 may record the management data describing the mapping relationship between logical units and physical erasing units (also called logical-to-physical mapping information) in at least one logical-to-physical mapping table. When the host system 11 is to read data from the memory storage device 10 or write data to the memory storage device 10, the memory management circuit 51 may access the rewritable non-volatile memory module 43 according to the information in the logical-to-physical mapping table.

In an exemplary embodiment, the memory management circuit 51 may send an erase command sequence to the rewritable non-volatile memory module 43. This erase command sequence may be configured to instruct the rewritable non-volatile memory module 43 to erase a certain physical erasing unit (also called the first physical erasing unit) to clear the data in the first physical erasing unit. For example, the first physical erasing unit may include one of the physical erasing units 610(0) to 610(A) in the storage area 601 of FIG. 6.

With correspondence to (or in response to) the erasing of the first physical erasing unit, the memory management circuit 51 may send a write command sequence to the rewritable non-volatile memory module 43. The write command sequence is configured to instruct the rewritable non-volatile memory module 43 to perform a dummy write operation on another physical erasing unit (also called a second physical erasing unit). In particular, the dummy write operation may be configured to store dummy data to the second physical erasing unit. The total number of the second physical erasing units may be one or a plurality.

In an exemplary embodiment, the dummy data is not mapped by any logical unit. That is, the dummy data does not include any valid data. For example, the dummy data may include a series of nonsense bits (e.g., a series of "0" or "1" bits) or consist of the nonsense bits.

In an exemplary embodiment, in the dummy writing operation, the dummy data is stored in one physical programming unit in the second physical erasing unit. For example, the dummy data may be stored in the first physical programming unit not yet used or about to be used in the second physical erasing unit. Moreover, in an exemplary embodiment, the dummy data may also be stored in a plurality of physical programming units in the second physical erasing unit not yet used or about to be used, which is not limited by the invention.

In an exemplary embodiment, after the dummy write operation is performed, the memory management circuit 51 may ignore a write failure event corresponding to the dummy write operation. For example, a write failure event corresponding to the dummy write operation may reflect that the dummy write operation failed. Or, from another perspective, even if the dummy write operation fails, the memory management circuit 51 may not perform related error processing for the write failure event.

In an exemplary embodiment, the memory management circuit 51 may also perform a normal write operation. For example, a normal write operation may be configured to store data from the host system 11 of FIG. 1 to the rewritable non-volatile memory module 43. In an exemplary embodiment, when receiving a write failure event corresponding to a normal write operation, the memory management circuit 51 may perform error processing for the write failure event. For example, the error processing may include re-storing the data correctly to the default storage address or reporting a write failure message to the host system 11 of FIG. 1, and the like.

Figure 7:
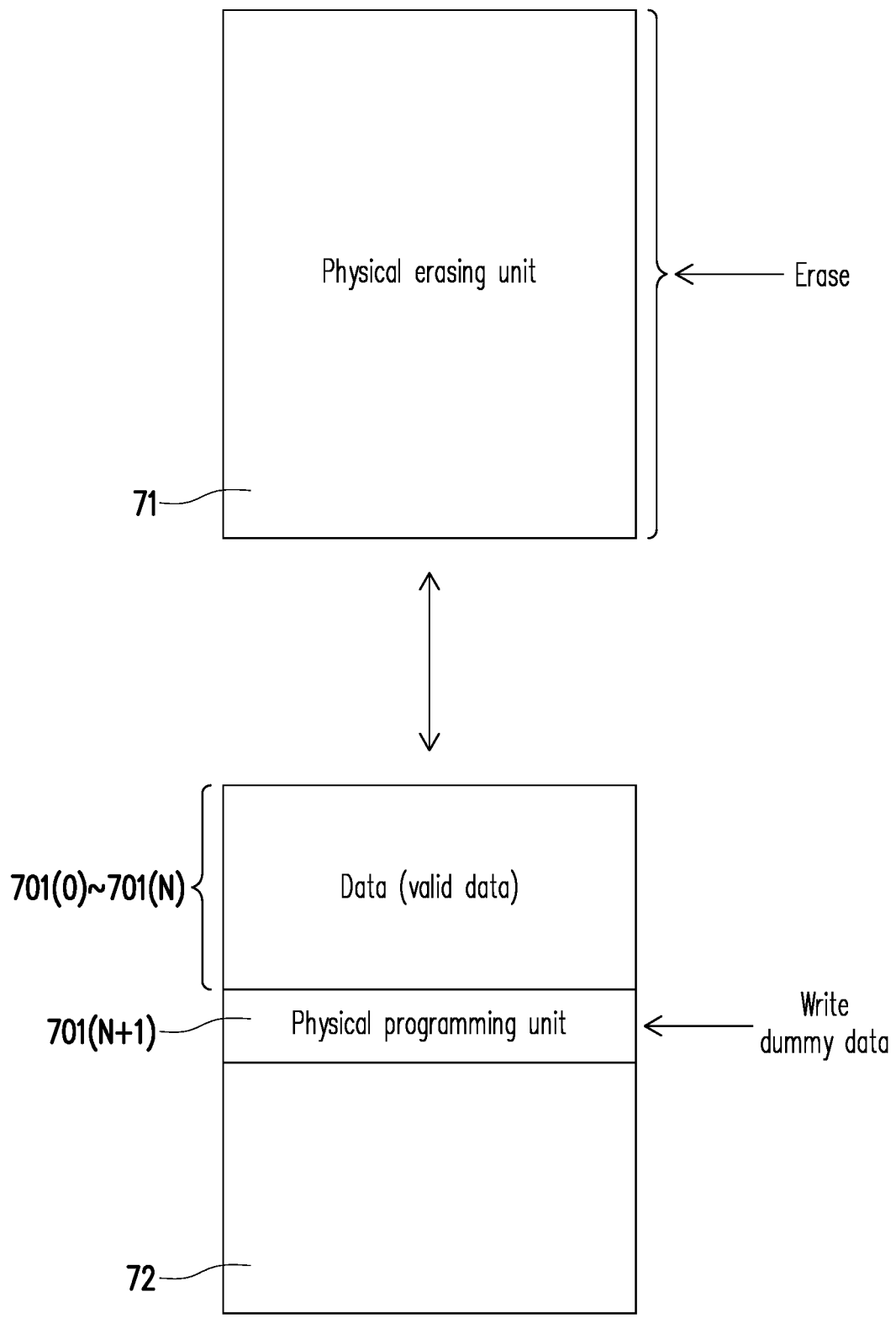
FIG. 7 is a schematic diagram of performing a dummy write operation on a second physical erasing unit after a first physical erasing unit is erased shown according to an exemplary embodiment of the invention.

FIG. 7 is a schematic diagram of performing a dummy write operation on a second physical erasing unit after a first physical erasing unit is erased shown according to an exemplary embodiment of the invention.

Please refer to FIG. 7, after the erase operation is performed on a physical erasing unit 71 (i.e., the first physical erasing unit), in response to the erase operation, one dummy write operation may be performed on a physical erasing unit 72 (i.e., the second physical erasing unit). For example, assuming that physical programming units 701(0) to 701(N) in the physical erasing unit 72 already have stored data (such as valid data), the first physical programming unit not yet used or about to be used in the physical erasing unit 72 is the physical programming unit 701(N+1). Therefore, in the dummy write operation for the physical erasing unit 72, dummy data may be written into the physical programming unit 701(N+1).

In particular, even if the data write operation (i.e., dummy write operation) to the physical programming unit 701(N+1) fails, the memory management circuit 51 may ignore the write failure event corresponding to the physical programming unit 701(N+1) or the dummy write operation. Or, from another point of view, regardless of whether the data write operation (i.e., dummy write operation) to the physical programming unit 701(N+1) is successful, the memory management circuit 51 does not perform an error processing procedure such as data rewriting for the physical programming unit 701(N+1) or the dummy data.

In an exemplary embodiment, after the dummy write operation is performed on the second physical erasing unit, the memory management circuit 51 may send another write command sequence to the rewritable non-volatile memory module 43. The write command sequence is configured to instruct the rewritable non-volatile memory module 43 to perform a normal write operation on the second physical erasing unit. For example, the normal write operation may be configured to store normal data (such as data from the host system 11 of FIG. 1) to the second physical erasing unit.

Figure 8:
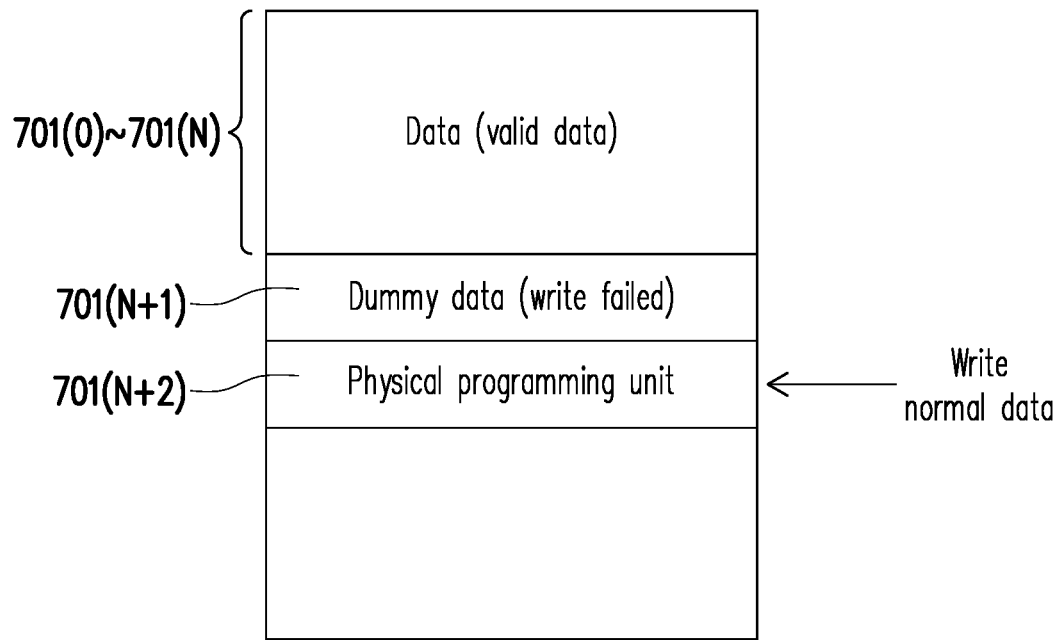
FIG. 8 is a schematic diagram of performing a normal write operation on a second physical erasing unit after a dummy write operation is performed on the second physical erasing unit shown according to an exemplary embodiment of the invention.

FIG. 8 is a schematic diagram of performing a normal write operation on a second physical erasing unit after a dummy write operation is performed on the second physical erasing unit shown according to an exemplary embodiment of the invention.

Referring to FIG. 8, continuing from the exemplary embodiment of FIG. 7, after a dummy write operation is performed on the physical erasing unit 72 to write dummy data into the physical programming unit 701(N+1), one normal write operation may be performed regardless of whether the data write operation (i.e., dummy write operation) to the physical programming unit 701(N+1) is successful. This normal write operation may be configured to write normal data (such as data from the host system 11 of FIG. 1) into the first physical programming unit of the physical erasing unit 72 not yet used or about to be used.

Taking FIG. 8 as an example, after attempting to write dummy data into the physical programming unit 701(N+1), even though the write operation to the physical programming unit 701(N+1) fails, the next piece of data (i.e., normal data) may still be normally stored in the physical programming unit 701(N+2). Moreover, more data may be continuously stored in other physical programming units not yet used or about to be used in the physical erasing unit 72 without being affected by the write status of the dummy data in the physical programming unit 701(N+1) (for example, write failure status).

In an exemplary embodiment, after each erase operation is performed on the first physical erasing unit, the memory management circuit 51 performs the dummy write operation on the second physical erasing unit. However, in an exemplary embodiment, after the erase operation is performed on the first physical erasing unit, the memory management circuit 51 may temporarily not perform the dummy write operation on the second physical erasing unit until there is new data (i.e., normal data) that needs to be stored in the second physical erasing unit.

In an exemplary embodiment, after the erase operation is performed on the first physical erasing unit, with correspondence to the erasing of the first physical erasing unit, the memory management circuit 51 may temporarily store identification information corresponding to the second physical erasing unit. For example, the identification information may be stored in the buffer memory 55 of FIG. 5. For example, the identification information may include the serial number or address information of the second physical erasing unit, or other information that may be used to identify the second physical erasing unit. Before a normal write operation needs to be performed on the second physical erasing unit to store new data, the memory management circuit 51 may temporarily not perform the dummy write operation on the second physical erasing unit.

In an exemplary embodiment, after it is determined that a normal write operation needs to be performed on the second physical erasing unit to store new data (for example, after receiving a write command from the host system 11 of FIG. 1), before a normal write operation is performed on the second physical erasing unit, the memory management circuit 51 may first send a corresponding write command sequence according to the identification information to instruct the rewritable non-volatile memory module 43 to perform the dummy write operation on the second physical erasing unit. After the dummy write operation is performed, the memory management circuit 51 may continue to send another write command sequence to perform the normal write operation on the second physical erasing unit. Accordingly, a plurality of dummy data may be prevented from being continuously stored in the second physical erasing unit due to the first physical erasing unit being erased multiple times before the new data is stored in the second physical erasing unit. For the operation details of the normal write operation, refer to the exemplary embodiment of FIG. 8, and details are not repeated herein.

In an exemplary embodiment, the identification information temporarily stored in the buffer memory 55 of FIG. 5 may disappear due to the shutdown or power failure of the memory storage device 10. Therefore, after the memory storage device 10 is turned on or powered on again, the memory management circuit 51 does not need to perform the dummy write operation on the second physical erasing unit.

In an exemplary embodiment, after the erase operation is performed on the first physical erasing unit, if the memory storage device 10 is rebooted or powered on again, the erase operation may not affect the data write operation of the second physical erasing unit after rebooting or re-powering. Therefore, even if the identification information temporarily stored in the buffer memory 55 of FIG. 5 disappears because the memory storage device 10 is turned off or powered off, the subsequent data writing performance to the second physical erasing unit is still not affected.

In an exemplary embodiment, the second physical erasing unit may include at least a portion of physical erasing units in the rewritable non-volatile memory module 43 not fully written. In an exemplary embodiment, a physically erasing unit not fully written is also called an open unit or an open block. In an exemplary embodiment, the second physical erasing unit may include all physical erasing units in the rewritable non-volatile memory module 43 not fully written. In an exemplary embodiment, the second physical erasing unit may also include one or a plurality of physical erasing units in the rewritable non-volatile memory module 43 not yet written with data (such as valid data).

In an exemplary embodiment, the second physical erasing unit (only) includes the physical erasing units in the rewritable non-volatile memory module 43 that have some correlation with the first physical erasing unit. For example, this correlation may reflect that after the erase operation is performed on the first physical erasing unit, the data write operation to the second physical erasing unit has a very high probability (even 100%) of failure.

In an exemplary embodiment, the memory management circuit 51 may read identification information of at least one physical erasing unit associated with the first physical erasing unit from management information with correspondence to the erasing of the first physical erasing unit. For example, the management information may record identification information of at least one physical erasing unit associated with the first physical erasing unit. For example, the management information may be stored in the system area of the rewritable non-volatile memory module 43 to avoid being modified by the user. The memory management circuit 51 may determine the second physical erasing unit from the plurality of physical erasing units in the rewritable non-volatile memory module 43 according to the obtained identification information.

In an exemplary embodiment, after the erase operation is performed on the first physical erasing unit, if the data write operation performed on a certain physical erasing unit has a high probability (even 100%) of failure, the physical erasing unit may be regarded as being associated with the first physical erasing unit. The memory management circuit 51 may record the identification information of the physical erasing unit associated with the first physical erasing unit in the management information. Then, after the erase operation is performed on the first physical erasing unit, the memory management circuit 51 may determine to perform a dummy write operation on a specific physical erasing unit (i.e., the second physical erasing unit) according to the management information. In particular, after the dummy write operation is performed on the second physical erasing unit, the second physical erasing unit may be configured to normally store data without being affected by the erasing of the first physical erasing unit.

Figure 9:
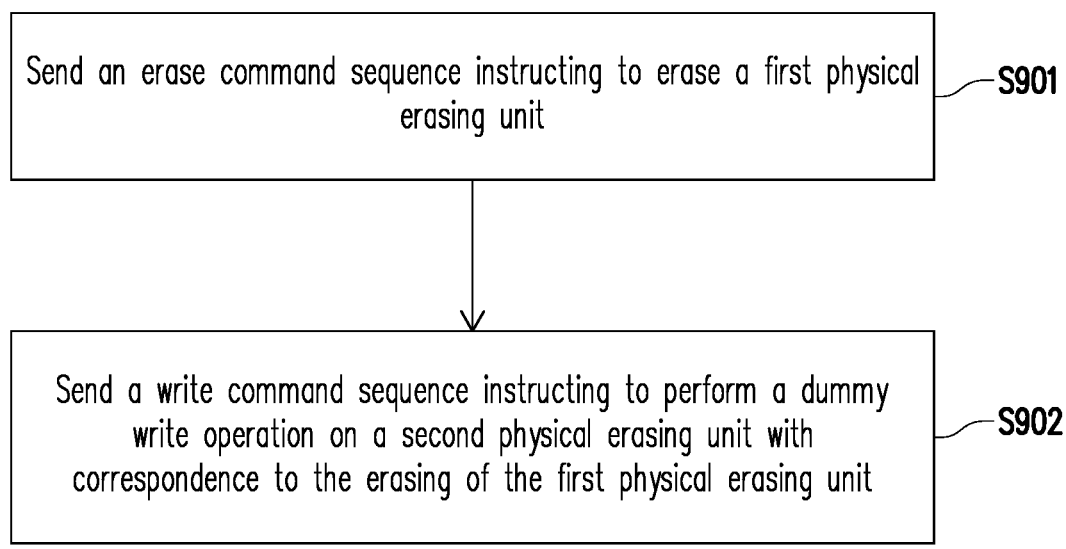
FIG. 9 is a flowchart of a memory management method shown according to an exemplary embodiment of the invention.

FIG. 9 is a flowchart of a memory management method shown according to an exemplary embodiment of the invention.

Please refer to FIG. 9, in step S901, an erase command sequence is sent, wherein the erase command sequence is configured to erase a first physical erasing unit in a rewritable non-volatile memory module. In step S902, a write command sequence is sent with correspondence to the erasing of the first physical erasing unit, wherein the write command sequence is configured to perform a dummy write operation on a second physical erasing unit in the rewritable non-volatile memory module. In particular, the dummy write operation is configured to store dummy data to the second physical erasing unit.

Figure 10:
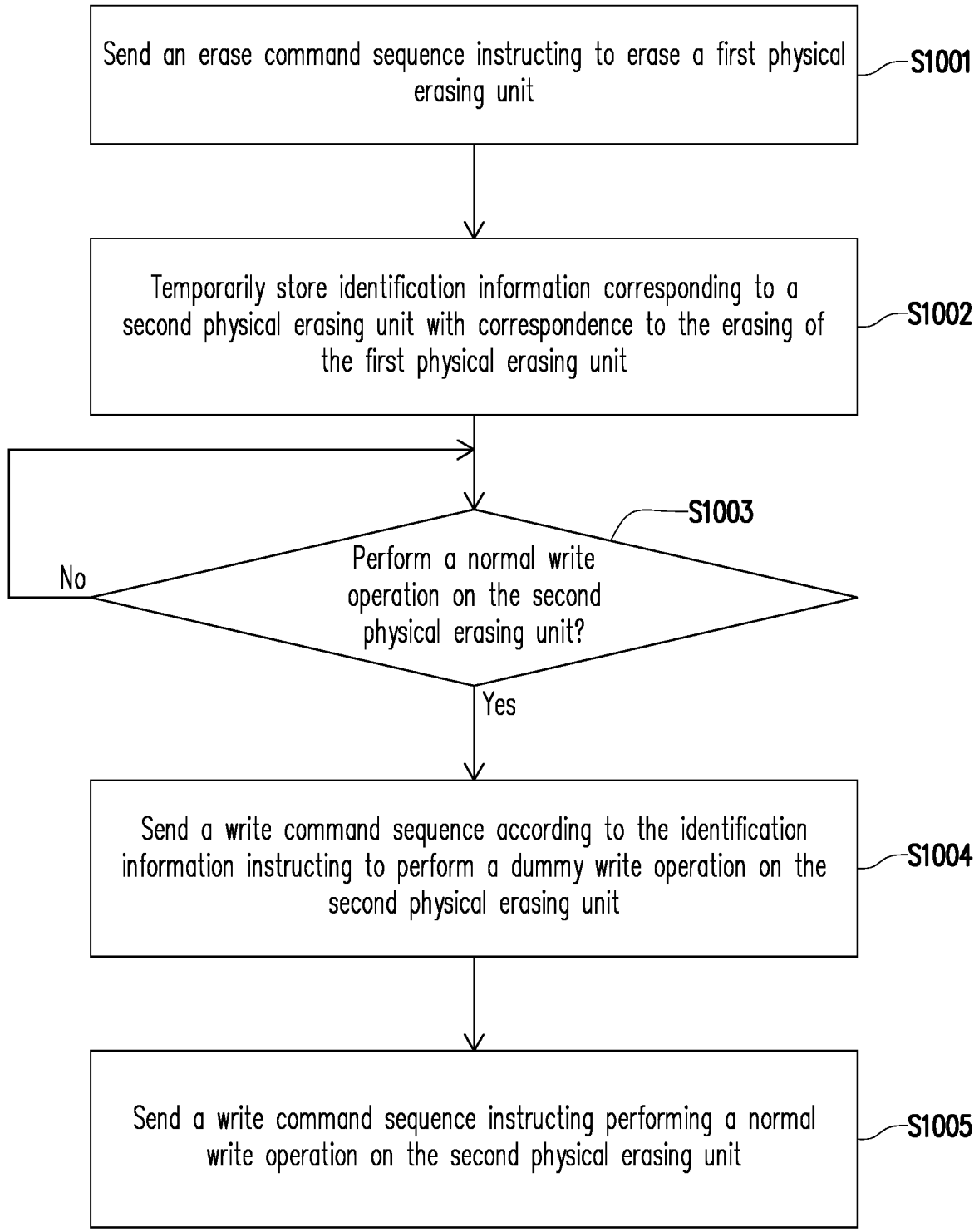
FIG. 10 is a flowchart of a memory management method shown according to an exemplary embodiment of the invention.

FIG. 10 is a flowchart of a memory management method shown according to an exemplary embodiment of the invention.

Please refer to FIG. 10, in step S1001, an erase command sequence is sent, wherein the erase command sequence is configured to erase a first physical erasing unit in a rewritable non-volatile memory module. In step S1002, identification information corresponding to a second physical erasing unit is temporarily stored with correspondence to the erasing of the first physical erasing unit. In step S1003, whether a normal write operation needs to be performed on the second physical erasing unit is determined. If (or in response to) it is temporarily not needed to perform a normal write operation on the second physical erasing unit, step S1003 may be repeated.

Moreover, if (or in response to) a normal write operation needs to be performed on the second physical erasing unit to store data, in step S1004, a write command sequence is sent according to the temporarily stored identification information, wherein the write command sequence is configured to perform a dummy write operation on the second physical erasing unit. After the dummy write operation is performed, regardless of whether the dummy write operation is successful, in step S1005, a write command sequence is sent, wherein the write command sequence is configured to perform a normal write operation on the second physical erasing unit. It should be noted that the exemplary embodiments of FIG. 9 and FIG. 10 may be implemented together with the exemplary embodiments of FIG. 7 and FIG. 8, and relevant details are not repeated herein.

However, each step in FIG. 9 and FIG. 10 is as described in detail above, and is not repeated herein. It should be mentioned that, each step in FIG. 9 and FIG. 10 may be implemented as a plurality of program codes or circuits, and the present application is not limited thereto. Moreover, the method of FIG. 9 and FIG. 10 may be used with the above exemplary embodiments, and may also be used alone, and the present application is not limited thereto.

Based on the above, the memory management method, memory storage device, and memory control circuit unit provided by the embodiments of the invention can, after the erase operation is performed on the first physical erasing unit, correspondingly perform the dummy write operation on the second physical erasing unit associated with the first physical erasing unit. In particular, after the dummy write operation is performed, the second physical erasing unit may be used normally without being affected by the erasing of the first physical erasing unit. In this way, the usage efficiency of the physical erasing unit may be effectively improved.

Although the disclosure has been disclosed by the above embodiments, they are not intended to limit the disclosure. It is apparent to one of ordinary skill in the art that modifications and variations to the disclosure may be made without departing from the spirit and scope of the disclosure. Accordingly, the protection scope of the disclosure will be defined by the appended claims.

What is claimed is:

1. A memory management method, configured for a rewritable non-volatile memory module, wherein the rewritable non-volatile memory module comprises a plurality of physical erasing units, and the memory management method comprises:
    sending an erase command sequence, wherein the erase command sequence is configured to erase a first physical erasing unit in the plurality of physical erasing units; and
    sending a write command sequence with correspondence to the erasing of the first physical erasing unit, wherein the write command sequence is configured to perform a dummy write operation on a second physical erasing unit in the plurality of physical erasing units, and
    the dummy write operation is configured to store dummy data to the second physical erasing unit.

2. The memory management method of claim 1, further comprising:
    ignoring a write failure event corresponding to the dummy write operation after the dummy write operation is performed.

3. The memory management method of claim 1, wherein the dummy data is not mapped by any logical unit.

4. The memory management method of claim 1, wherein in the dummy write operation, the dummy data is stored in one physical programming unit in the second physical erasing unit.

5. The memory management method of claim 1, wherein the operation of sending the write command sequence with correspondence to the erasing of the first physical erasing unit comprises:
    temporarily storing identification information corresponding to the second physical erasing unit with correspondence to the erasing of the first physical erasing unit; and
    sending the write command sequence according to the identification information before a normal write operation is performed on the second physical erasing unit.

6. The memory management method of claim 1, wherein the second physical erasing unit comprises at least a portion of the plurality of physical erasing units not fully written.

7. The memory management method of claim 1, further comprising:
    reading identification information of at least one physical erasing unit associated with the first physical erasing unit from management information with correspondence to the erasing of the first physical erasing unit; and
    determining the second physical erasing unit from the plurality of physical erasing units according to the identification information.

8. A memory storage device, comprising:
    a connection interface unit configured to be coupled to a host system;
    a rewritable non-volatile memory module, wherein the rewritable non-volatile memory module comprises a plurality of physical erasing units; and
    a memory control circuit unit coupled to the connection interface unit and the rewritable non-volatile memory module,
    wherein the memory control circuit unit is configured to:
        send an erase command sequence, wherein the erase command sequence is configured to erase a first physical erasing unit in the plurality of physical erasing units; and
        send a write command sequence with correspondence to the erasing of the first physical erasing unit, wherein the write command sequence is configured to perform a dummy write operation on a second physical erasing unit in the plurality of physical erasing units, and
        the dummy write operation is configured to store dummy data to the second physical erasing unit.

9. The memory storage device of claim 8, wherein the memory control circuit unit is further configured to:
    ignore a write failure event corresponding to the dummy write operation after the dummy write operation is performed.

10. The memory storage device of claim 8, wherein the dummy data is not mapped by any logical unit.

11. The memory storage device of claim 8, wherein in the dummy write operation, the dummy data is stored in one physical programming unit in the second physical erasing unit.

12. The memory storage device of claim 8, wherein the operation of the memory control circuit unit sending the write command sequence with correspondence to the erasing of the first physical erasing unit comprises:
- temporarily storing identification information corresponding to the second physical erasing unit with correspondence to the erasing of the first physical erasing unit; and
- sending the write command sequence according to the identification information before a normal write operation is performed on the second physical erasing unit.

13. The memory storage device of claim 8, wherein the second physical erasing unit comprises at least a portion of the plurality of physical erasing units not fully written.

14. The memory storage device of claim 8, wherein the memory control circuit unit is further configured to:
- read identification information of at least one physical erasing unit associated with the first physical erasing unit from management information with correspondence to the erasing of the first physical erasing unit; and
- determine the second physical erasing unit from the plurality of physical erasing units according to the identification information.

15. A memory control circuit unit, configured to control a rewritable non-volatile memory module, wherein the rewritable non-volatile memory module comprises a plurality of physical erasing units, and the memory control circuit unit comprises:
- a host interface configured to be coupled to a host system;
- a memory interface configured to be coupled to the rewritable non-volatile memory module; and
- a memory management circuit coupled to the host interface and the memory interface,
- wherein the memory management circuit is configured to:
  - send an erase command sequence, wherein the erase command sequence is configured to erase a first physical erasing unit in the plurality of physical erasing units; and
  - send a write command sequence with correspondence to the erasing of the first physical erasing unit, wherein the write command sequence is configured to perform a dummy write operation on a second physical erasing unit in the plurality of physical erasing units, and
  - the dummy write operation is configured to store dummy data to the second physical erasing unit.

16. The memory control circuit unit of claim 15, wherein the memory management circuit is further configured to:
- ignore a write failure event corresponding to the dummy write operation after the dummy write operation is performed.

17. The memory control circuit unit of claim 15, wherein the dummy data is not mapped by any logical unit.

18. The memory control circuit unit of claim 15, wherein in the dummy write operation, the dummy data is stored in one physical programming unit in the second physical erasing unit.

19. The memory control circuit unit of claim 15, wherein the operation of the memory management circuit sending the write command sequence with correspondence to the erasing of the first physical erasing unit comprises:
- temporarily storing identification information corresponding to the second physical erasing unit with correspondence to the erasing of the first physical erasing unit; and
- sending the write command sequence according to the identification information before a normal write operation is performed on the second physical erasing unit.

20. The memory control circuit unit of claim 15, wherein the second physical erasing unit comprises at least a portion of the plurality of physical erasing units not fully written.

21. The memory control circuit unit of claim 15, wherein the memory management circuit is further configured to:
- read identification information of at least one physical erasing unit associated with the first physical erasing unit from management information with correspondence to the erasing of the first physical erasing unit; and
- determine the second physical erasing unit from the plurality of physical erasing units according to the identification information.

* * * * *